United States Patent
Braford, Jr. et al.

(10) Patent No.: US 6,840,363 B2
(45) Date of Patent: Jan. 11, 2005

(54) MULTI-DISK FRICTION DEVICE SELECTIVE LUBRICATION ON DEMAND

(75) Inventors: Thomas E. Braford, Jr., Brighton, MI (US); Thomas Schmidt, Landau (DE)

(73) Assignee: BorgWarner, Inc., Auburn Hills, MI (US)

(*) Notice: Subject to any disclaimer, the term of this patent is extended or adjusted under 35 U.S.C. 154(b) by 0 days.

(21) Appl. No.: 10/360,044

(22) Filed: Feb. 6, 2003

(65) Prior Publication Data

US 2004/0154894 A1 Aug. 12, 2004

(51) Int. Cl.$^7$ ...................... F16D 25/0638; F16D 13/72
(52) U.S. Cl. .............................. 192/70.12; 192/85 AA; 192/106 F; 192/113.35
(58) Field of Search ...................... 192/70.12, 85 AA, 192/106 F, 113.35; 188/71.5, 71.6, 264 E

(56) References Cited

U.S. PATENT DOCUMENTS

| | | | |
|---|---|---|---|
| 3,490,312 A | 1/1970 | Seitz et al. ................. 74/711 |
| 3,823,802 A | * 7/1974 | Winzeler et al. ......... 192/106 F |
| 3,834,503 A | * 9/1974 | Maurer et al. .......... 192/113.35 |
| 4,205,739 A | 6/1980 | Shelby et al. ............... 192/113 |
| 4,270,647 A | 6/1981 | Leber ........................ 192/113 |
| 4,713,980 A | 12/1987 | Ida et al. ..................... 74/467 |
| 4,759,432 A | * 7/1988 | Jürgens et al. ........... 192/85 AA |
| 4,841,803 A | 6/1989 | Hamano et al. ............... 74/665 |
| 5,495,927 A | 3/1996 | Samie et al. ............. 192/70.12 |
| 5,577,588 A | 11/1996 | Raszkowski ........... 192/113.35 |
| 5,613,588 A | 3/1997 | Vu ......................... 192/113.35 |
| 5,755,314 A | 5/1998 | Kanda et al. ............. 192/70.12 |
| 6,189,669 B1 | * 2/2001 | Kremer et al. ........... 192/70.12 |

FOREIGN PATENT DOCUMENTS

JP 02120517 A * 5/1990 ........... F16D/25/12

* cited by examiner

Primary Examiner—Richard M. Lorence
(74) Attorney, Agent, or Firm—Bliss McGlynn, P.C.; Greg Dziegielewski

(57) ABSTRACT

A friction device (10, 110) having a drive member (12, 112) and a driven member (14, 114) which define a clutch housing (16, 116) therebetween. A clutch pack (24, 124) is interposed between the drive and driven members and is operable to connect and disconnect the drive and driven members for transferring and interrupting torque therebetween. A control valve (74, 174) is supported in the clutch housing (16, 116) and is moveable between open and closed positions. The control valve (74, 174) is operable to control the flow of cooling fluid from the source to the clutch pack (24, 124). The friction device also includes an actuator (80, 180) that is operatively connected to either a piston assembly (40) or the clutch pack (124) and is adapted to engage the control valve (74, 174) such that movement of the piston assembly (40) from its disengaged position to its engaged position moves the control valve (74, 174) from its closed position to its open position to selectively allow flow of pressurized cooling fluid past the control valve (74, 174) and into contact with the clutch pack (24, 124) when the drive and driven members are connected.

17 Claims, 2 Drawing Sheets

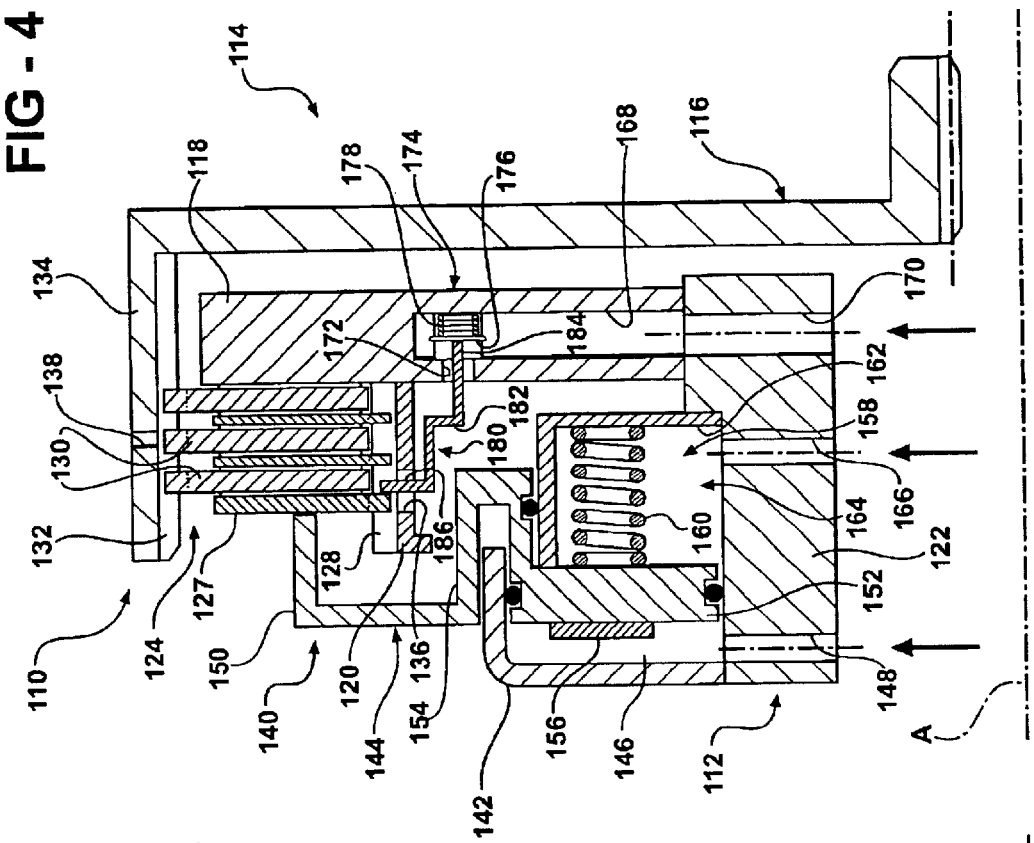
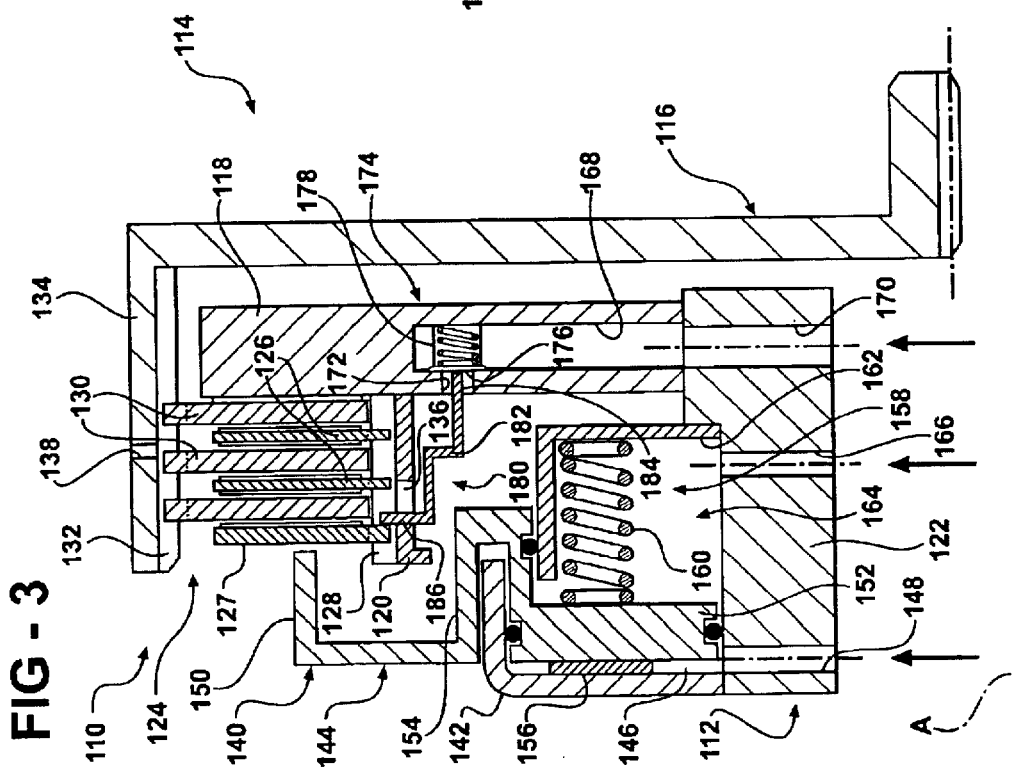

MULTI-DISK FRICTION DEVICE SELECTIVE LUBRICATION ON DEMAND

BACKGROUND OF THE INVENTION

1. Field of the Invention

The present invention relates, generally, to friction devices such as clutch or brake assemblies for use in transmissions, differentials or brake systems. More specifically, the present invention relates to a multi-disk friction clutch or brake systems having selectively actuated lubrication for cooling the clutch on demand.

2. Description of the Related Art

Multi-disk friction devices are employed in a wide range of applications as clutches or brakes. For example, such friction devices are frequently used in land-based vehicles. Generally speaking, land vehicles require three basic components. These components include a power plant (such as an internal combustion engine), a powertrain, and wheels. The powertrain's main component is typically referred to as the "transmission." Engine torque and speed are converted in the transmission in accordance with the tractive-power demand of the vehicle. Transmissions include one or more gear sets which may include an inner sun gear, intermediate planet gears which are supported by their carriers and outer ring gears. Various components of the gear sets are held or powered to change the gear ratios in the transmission. The multi-disk pack clutch is a friction device which is commonly employed as a holding mechanism in a transmission or differential. In addition, multi-disk friction devices also find use in industrial applications, such as wet brakes, for example, to brake the wheels on earth moving equipment.

The multi-disk pack clutch or brake assembly has a clutch sub-assembly including a set of plates and a set of friction disks which are interleaved between one another. The plates and friction disks are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction disks to come in contact with respect to one another. In certain applications, it is known to employ several multi-disk pack friction devices in combination to establish different drive connections throughout the transmission or differential to provide various gear ratios in operation, or to brake a component.

The confronting faces of the interleaved plates and friction disks are covered with frictional surfaces. When a friction device is engaged, kinetic energy is converted into thermal energy and a considerable amount of heat is generated. If the frictional surfaces get too hot, they can burn which damages the friction surfaces and degrades the clutch or brake operational effectiveness. Accordingly, the heat generated when a friction device is engaged must be dissipated.

Multi-disk friction clutches and brake systems have traditionally relied on a continuous "splash" supply of coolant, typically automatic transmission fluid (ATF), to remove the heat generated during operation. Coolant is supplied at or near the inner diameter of the disks and moves radially outward across the friction surface under the influence of centrifugal forces. When the disks are not engaged, little or no cooling is usually required. However, with conventional cooling schemes employed in the related art, unneeded coolant is often supplied to the open clutch or brake. When this occurs, the coolant in the friction device is sheared by the interleaved plates and friction disks due to the differential rotational speeds of the drive and driven members which the clutch or brake bridges. This condition reduces the efficiency of the transmission through viscous shear losses in the fluid and ultimately results in lower fuel efficiency.

Additionally, when coolant is directed toward a friction device operating in an open pack mode wherein coolant is not needed, the coolant is not being used by friction devices which are engaged or otherwise require cooling. This also increases the volume of oil needed for a given transmission, differential or brake system and unnecessarily requires increasing the capacity of the associated pump.

It is known in the related art to selectively provide coolant to the clutch pack when the friction device has been engaged and to selectively interrupt coolant to the clutch pack when the friction device is disengaged. However, in general, the systems that have been proposed in the related art suffer from the disadvantage that they are overly complex in operation or are too difficult to be manufactured in a cost-effective manner.

Accordingly, there remains a need in the art for a friction device which may be selectively cooled on demand using forced coolant flow such as when the clutch or brake is engaged and wherein coolant to the clutch or brake may be selectively interrupted when not needed, such as when the clutch or brake is disengaged.

SUMMARY OF THE INVENTION

The present invention overcomes the disadvantages in the related art in a friction device having a drive member and a driven member which are rotatable about a common axis and which define a clutch housing therebetween. A clutch pack is interposed between the drive and driven members and is operable to connect and disconnect the drive and driven members for transferring and interrupting torque therebetween. A piston assembly is supported in the clutch housing and moveable between disengaged and engaged positions thereby actuating the clutch pack to connect and disconnect the drive and driven members. A source of pressurized cooling fluid is provided to the clutch pack through the clutch housing. A control valve is supported in the clutch housing and is moveable between open and closed positions. The control valve is operable to control the flow of cooling fluid from its source to the clutch pack. The friction device also includes an actuator that is operatively connected to the piston assembly and is adapted to engage the control valve such that movement of the piston assembly from its disengaged position to its engaged position moves the control valve from its closed position to its open position to selectively allow flow of pressurized cooling fluid past the control valve and into contact with the clutch pack when the drive and driven members are connected. In addition, the actuator is further operable to disengage the control valve such that the control valve moves to its closed position when the piston assembly moves from its engaged position to its disengaged position to selectively terminate flow of pressurized fluid into contact with the clutch pack when the drive and driven members are disconnected.

Alternatively, the actuator may be operatively connected to the clutch pack such that movement of the clutch pack from its disconnected position to its connected position opens the control valve to selectively allow flow of pressurized cooling fluid into contact with the clutch pack when the drive and driven members are connected. Similarly, the actuator is further operable to disengage from the control valve resulting in that the control valve is closed when the clutch pack moves from its connected position to its disconnected position to selectively terminate flow of pressurized cooling fluid into contact with the clutch pack when the drive and driven members are disconnected.

In this way, the friction device of the present invention provides coolant to the clutch pack when coolant is needed, such as when the clutch or brake is engaged, and interrupts coolant to the clutch pack when the coolant is not needed, such as when the clutch or brake is disengaged.

Accordingly, one advantage of the present invention is that a friction device is provided having selective cooling on demand.

Another advantage of the present invention is that viscous shear losses that are attributable to the coolant are reduced during open pack operation.

Still another advantage of the present invention is that it facilitates the use of a smaller capacity pump when compared with conventional systems which further reduces the cost of the associated transmission, differential or brake system.

Finally, these advantages are achieved in a friction device such as a clutch or brake assembly which is operationally efficient and cost-effective to manufacture relative to the complex systems proposed in the related art.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a partial cross-sectional side view of another embodiment of the friction device of the present invention shown operating in open pack mode;

FIG. 4 is a partial cross-sectional side view of the friction device illustrated in FIG. 3 wherein the clutch or brake is engaged.

DETAILED DESCRIPTION OF THE PREFERRED EMBODIMENT(S)

Figure 1:
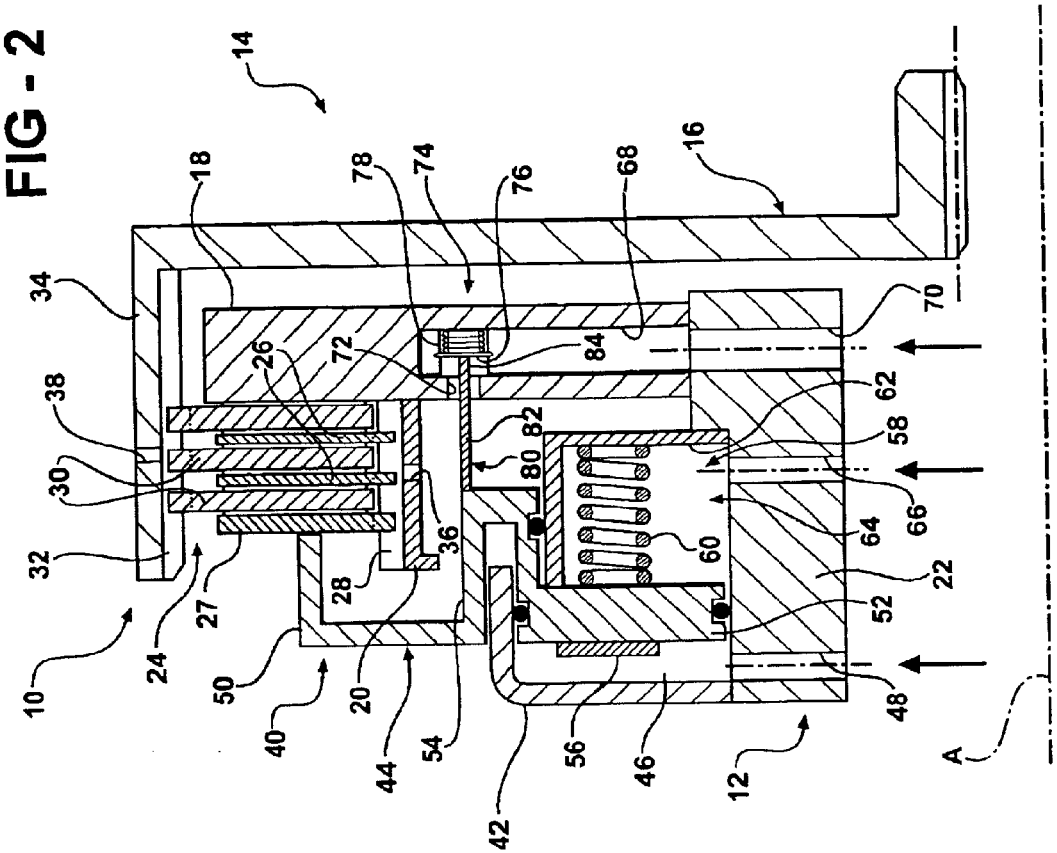
FIG. 1 is a partial cross-sectional side view illustrating the friction device of the present invention operating in an open pack mode.

Referring now to FIG. 1, a friction device such as a clutch or brake assembly of the present invention is generally indicated at 10. The friction device 10 is adapted to be employed in connection with a transmission, differential or brake system. For example only and not by way of limitation, as is commonly known in the art, but not shown in these figures, transmission assemblies typically include an input shaft which is operatively coupled to a prime mover, such as an internal combustion engine. In an automotive application, the transmission assembly also includes an output shaft which is operatively coupled to driven wheels through other drivetrain components such as a drive shaft and an axle having a differential. At least one, and often a plurality of, gear sets is operatively coupled between the input and output shafts. The transmission casing supports the input shaft, the output shaft and the gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power gear sets to change the gear ratio of the transmission. Further, and notwithstanding the automotive related context of the discussion above, from the description that follows, those having ordinary skill in the art will appreciate that the present invention may be employed in a transmission, differential or brake system whether used in an automotive, non-automotive or industrial application. Thus, to the extent the term "clutch" is used below in any context, this term should be given its broadest possible meaning including, but not limited to, clutches and brakes for use in transmissions, differential or braking systems of all types.

The friction device 10 includes a drive member, generally indicated at 12 and a driven member, generally indicated at 14, both of which are rotatable about a common axis A and which define a clutch housing, generally indicated at 16. The drive member 12 includes a main body 18, a clutch hub 20, and a piston hub 22. An annular clutch pack, one half of which is generally indicated at 24, is interposed between the drive 12 and driven 14 members and operates to connect and disconnect the drive 12 and driven 14 members for translating and interrupting torque therebetween. The clutch pack 24 includes a plurality of annular plates 26 splined at 28 to the clutch hub 20 of the drive member 12. A plurality of annular friction disks 30 are splined at 32 to the clutch hub 34 of the driven member 14 and interleaved between the plates 26. Together, the plates 26 and disks 30 of the annular clutch pack 24 define an inner diameter roughly at the spline 28 of the drive clutch hub 20 and an outer diameter roughly at the splines 32 of the driven clutch hub 34. The drive clutch hub 20 includes a plurality of inlet flow passages 36 extending therethrough. The inlet flow passages 36 are disposed in spaced relationship relative to one another about the rotational axis of the clutch pack 24. The inlet flow passages 36 provide fluid communication of cooling oil to the clutch pack 24 as will be described in greater detail below. On the other hand, the driven clutch hub 34 includes a like plurality of outlet ports 38 extending through the driven clutch hub 34 and that are spaced relative to one another about the rotational axis of the clutch pack 24. The outlet ports 38 provide fluid communication for cooling fluid from the clutch pack 24 to the sump (not shown). In one disposition shown in FIG. 1, the plates 26 and friction disks 30 rotate past one another in non-contacting relationship. The plates 26 and friction disks 30 are also axially movable relative to their respective splined hubs 20, 34 to come into frictional engagement, thereby reducing or eliminating relative rotation between the plates 26 and disks 30. The main body 18 of the drive member 12 cooperates with the clutch pack 24 to limit axial movement of the plates 26 and friction disks 30. When the disks 30 and plates 26 are engaged, the clutch pack 24 is sealed at its outer diameter.

This axial movement is achieved through the actuation of a piston assembly, generally indicated at 40. The piston assembly 40 is supported in the clutch housing 16 and includes a piston housing 42 and a piston, generally indicated at 44, rotatably supported upon the piston hub 22. The piston 44 is axially moveable relative to the piston housing 42. The piston 44 and the piston housing 42 cooperate to define an expandable chamber 46. A source of pressurized fluid is in communication with the expandable chamber 46 via pressure port 48 extending through the piston hub 22. The piston 44 is responsive to the pressure of fluid in the expandable chamber 46 to move between disengaged (FIG.

1) and engaged (FIG. 2) positions thereby actuating the clutch pack 24 to connect and disconnect drive and driven members 12, 14, respectively, as mentioned above.

More specifically, the piston 44 includes a head 50 that is adapted for compressive engagement with the first plate 27 of the clutch pack 24 thereby bringing the annular plates 26 and friction discs 30 into frictional contact to connect the drive and driven members 12, 14. In addition, the piston 44 includes a pressure plate 52 that is acted upon by the pressurized fluid in the expandable chamber 46 and a body 54 that extends between the head 50 and the pressure plate 52. A spacer 56 may be mounted on the pressure plate 52 to provide an initial small space between the piston 44 and the piston housing 42 when the piston 44 is disposed in its disengaged position (FIG. 1).

Figure 2:
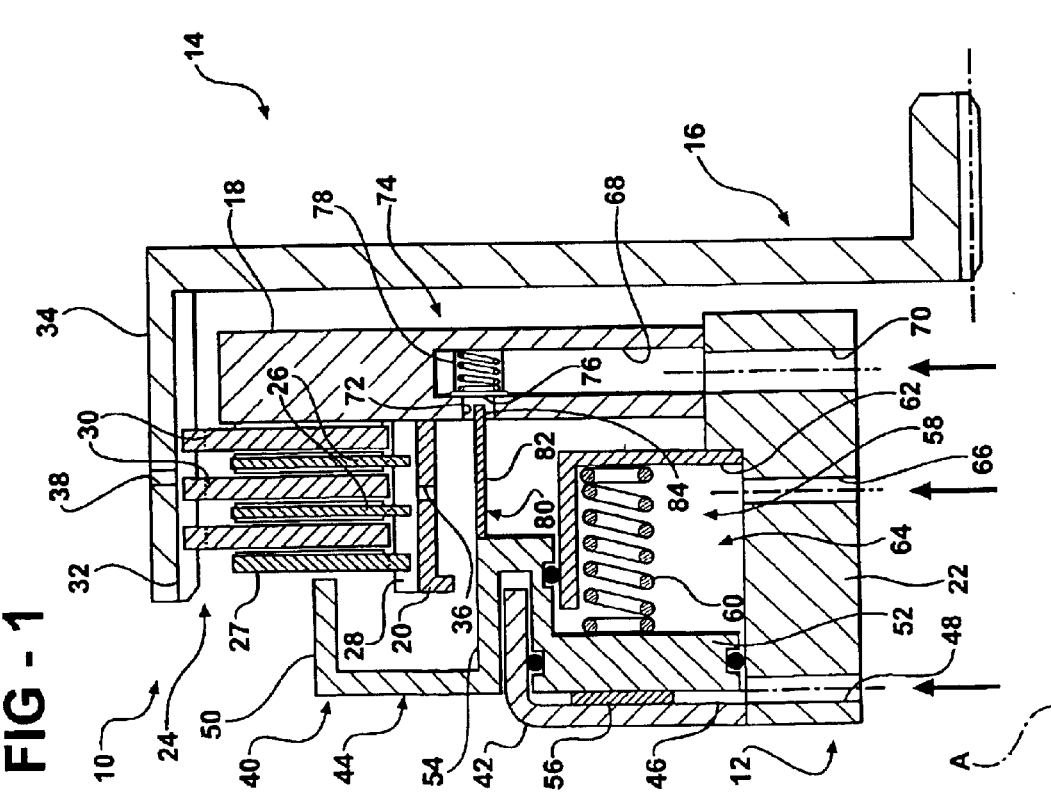
FIG. 2 is a partial cross-sectional side view of the friction device shown in FIG. 1 wherein the clutch or brake is engaged.

The piston assembly 40 may also include a return biasing mechanism, generally indicated at 58, that is employed to move the piston 44 to its disengaged position. More specifically, the piston assembly 40 includes a return biasing member 60 that acts on the pressure plate 52 to bias the piston 44 to its disengaged position in a direction opposite to movement of the piston 44 in response to forces generated by the pressurized apply fluid acting in the expandable chamber 46 on the pressure plate 52 of the piston 44. A retainer 62 cooperates with the pressure plate 52 to define a balance chamber 64. The return biasing member 60 acts between the retainer 62 and the pressure plate 52. In addition, a source of pressurized balance fluid communicates with the balance chamber 64 via the balance port 66 extending through the piston hub 22. The balance fluid acts in the balance chamber 64 on the pressure plate 52 and in conjunction with the biasing member 60 to selectively move the piston 44 to its disengaged position (FIG. 1). Thus, the return biasing member 60 and the balance fluid acts on the pressure plate 52 to provide a force in a direction opposite to the force generated by the pressure of the fluid acting in the expandable chamber 46. As illustrated in FIGS. 1 and 2, the return biasing member 60 is a coiled spring captured between its retainer 62 and the pressure plate 52 of the piston 44. It will be appreciated by those having ordinary skill in the art that the return biasing member 60 may include any biasing mechanism conventionally known in the art and is not limited to a coiled spring.

As alluded to above, just before the clutch pack 24 is engaged, the plates 26 and disks 30 come into frictional contact with one another until the relative rotational speed between the plates 26 and disks 30 become zero. In this disposition, the plates 26 and disks 30 are either rotating together at one speed or are both held against rotation, depending on the particular application in a transmission, differential or brake system. In any case, during the engagement of the plates 26 and disks 30, kinetic energy is converted to thermal energy and a considerable amount of heat is generated. This heat must be dissipated. To this end, a source of pressurized cooling fluid is also provided to the clutch pack 24 through the clutch housing 16. The main body 18 of the drive member 12 includes a cooling passage 68 defined therein. The cooling passage 68 is in fluid communication with an inlet port 70 extending through the piston hub 22. In turn, the inlet port 70 is in fluid communication with the source of pressurized cooling fluid. A plurality of outlet ports 72 extend through the main body 18 and are disposed spaced from one another annularly about the rotational axis A of the clutch pack 24. The outlet ports 72 provide fluid communication between the cooling passage 68 and the clutch pack 24.

A control valve, generally indicated at 74, is supported in the clutch housing 16 and is moveable between open and closed positions as shown in FIGS. 2 and 1, respectively. The control valve 74 is operable to control the flow of cooling fluid from the source to the clutch pack 24 as will be described in greater detail below. The control valve 74 includes an annular sealing plate 76 and a biasing member 78. The sealing plate 76 is supported in the cooling passage 68 adjacent the outlet ports 72 and is biased into the closed position by the biasing member 78, as shown in FIG. 1. An actuator 80 is operatively connected to the piston assembly 40 and is adapted to engage the control valve 74 such that movement of the piston 44 from the disengaged position to the engaged position moves the sealing plate 76 of the control valve 74 from the closed position (FIG. 1) to the open position (FIG. 2) to selectively allow flow of pressurized cooling fluid past the sealing plate 76, through the outlet ports 72 and into contact with the clutch pack 24 when the drive and driven members are connected. In addition, the actuator 80 is also operable to disengage the control valve 74 such that the sealing plate 76 moves to its closed position (FIG. 1) and covers the outlet ports 72 when the piston 44 moves from its engaged position (FIG. 2) to its disengaged position (FIG. 1). In this way, the flow of pressurized cooling fluid into contact with the clutch pack 24 is selectively terminated when the drive and driven members are disconnected.

The actuator 80 includes an annular hub 82 extending from the piston 44 toward the control valve 74. In the embodiment illustrated in FIGS. 1 and 2, the actuator 80 is operatively connected to the body 54 of the piston 44. The annular hub 82 includes a plurality of fingers 84 that are defined at the distal end thereof. The plurality of fingers 84 are adapted to extend through the outlet ports 72 and move the sealing plate 76 from its closed position to its open position against the biasing force of the biasing member 78 when the piston 44 is moved to its engaged position. In the preferred embodiment, the biasing member 78 includes a plurality of springs that are supported in the cooling passage 68 about the axis of rotation of the clutch pack 24. Collectively, these springs act to bias the sealing plate 76 to its closed position and in a direction opposite to the force generated by the actuator 80.

When operating in its disconnected state, the plates 26 and discs 30 of the clutch pack 24 in the friction device 10 are separated from one another and turn past each other in substantially non-contacting relationship. In this operative mode, there is no need to cool the clutch pack. Thus, the control valve 74 remains closed and no cooling fluid is supplied to the clutch pack 24. This reduces parasitic losses that would otherwise occur if the plates 26 and discs 30 were forced to turn through a bath of unnecessary cooling fluid. In addition, the fluid may be routed to other working devices that are in actual need of cooling.

When the friction device 10 is selected for actuation, pressurized fluid flows into the expandable chamber 46 via the pressure port 48 extending through the piston hub 22. The pressurized fluid acts on the pressure plate 52 of the piston 44 to move it from its disengaged position (FIG. 1) to its engaged position (FIG. 2) and against the biasing force of the return biasing member 60. At the same time, the balanced chamber 64 is drained of any fluid through the balance port 66 formed in the piston hub 22. The head 50 of the piston 44 engages the first plate 27 in the clutch pack 24 and moves the adjacent plates 26 and discs 30 axially into frictional engagement with one another thereby connecting the clutch pack 24 and translating torque between the drive and driven members 12, 14. With the movement of the piston 44, the fingers 84 formed on the terminal end of the actuator hub 82 move through the outlet ports 72 formed in the main body 18 of the clutch hub 20 and engage the sealing plate 76. More specifically, the fingers 84 of the actuator hub 82 move the sealing plate 76 of the control valve 74 away from the outlet ports 72. In this way, the control valve 74 is moved from its closed position to its open position. Cooling fluid selectively flows from its source, through the cooling passage 68, out the outlet ports 72 and through the inlet flow passages 36 extending through the drive clutch hub 20. The cooling fluid then moves across the plates 26 and friction discs 30. Each of the plates and friction discs may include grooves (not shown) to facilitate the cooling of the frictional surfaces. The cooling fluid flows generally radially outward and exits the clutch pack 24 via the outlet ports 38 formed through the driven clutch hub 34.

When the friction device is to be disengaged, the pressurized fluid is drained from the expandable chamber 46 and the balance chamber 64 is filled with pressurized balance fluid via the balance port 66. Together, the return biasing member 60 and the balance fluid act on the pressure plate 52 of the piston 44 in a direction opposite to the force generated by the apply fluid to move the piston 44 from its engaged position to its disengaged position. In this way, the head 50 of the piston 44 is moved away from the first plate 27 in the clutch pack 24 and the discs 30 and plates 26 are allowed to separate. The actuator 80 moves with the piston 44 such that the biasing member 78 of the control valve 74 moves the sealing plate 76 into its closed position thereby interrupting the flow of cooling oil through the outlet ports.

Referring now to FIGS. 3 and 4 where like numerals which have been increased by 100 are used to designate like structure, another embodiment of the friction device of the present invention is generally indicated at 110. The friction device 10 includes a drive member, generally indicated at 112 and a driven member, generally indicated at 114, both of which are rotatable about a common axis A and which define a clutch housing, generally indicated at 116. The drive member 112 includes a main body 118, a clutch hub 120, and a piston hub 122. An annular clutch pack, one half of which is generally indicated at 124, is interposed between the drive 112 and driven 114 members and operates to connect and disconnect the drive 112 and driven 114 members for translating and interrupting torque therebetween. The clutch pack 124 includes a plurality of annular plates 126 splined at 128 to the clutch hub 120 of the drive member 112. A plurality of annular friction disks 130 are splined at 132 to the clutch hub 134 of the driven member 114 and interleaved between the plates 126. Together, the plates 126 and disks 130 of the annular clutch pack 124 define an inner diameter roughly at the spline 128 of the drive clutch hub 120 and an outer diameter roughly at the splines 132 of the driven clutch hub 134. The drive clutch hub 120 includes a plurality of inlet flow passages 136 extending therethrough. The inlet flow passages 136 are disposed in spaced relationship relative to one another about the rotational axis of the clutch pack 124. The inlet flow passages 136 provide fluid communication of cooling oil to the clutch pack 124 in the same manner as described above. On the other hand, the driven clutch hub 134 includes a like plurality of outlet ports 138 extending through the driven clutch hub 134 and that are spaced relative to one another about the rotational axis of the clutch pack 124. The outlet ports 138 provide fluid communication for cooling fluid from the clutch pack 124 to the sump (not shown). In one disposition shown in FIG. 3, the plates 126 and friction disks 130 rotate past one another in non-contacting relationship. The plates 126 and friction disks 130 are also axially movable relative to their respective splined hubs 120, 134 to come into frictional engagement, thereby reducing or eliminating relative rotation between the plates 126 and disks 130. The main body 118 of the drive member 112 cooperates with the clutch pack 124 to limit axial movement of the plates 126 and friction disks 130. When the disks and plates are engaged, the clutch pack 124 is sealed at its outer diameter.

This axial movement is achieved through the actuation of a piston assembly, generally indicated at 140. The piston assembly 140 is supported in the clutch housing 116 and includes a piston housing 142 and a piston 144 rotatably supported upon the piston hub 122. The piston 144 is axially moveable relative to the piston housing 142. The piston 144 and the piston housing 142 cooperate to define an expandable chamber 146. A source of pressurized fluid is in communication with the expandable chamber 146 via pressure port 148 extending through the piston hub 120. The piston 144 is responsive to the pressure of fluid in the expandable chamber 146 to move between disengaged (FIG. 3) and engaged (FIG. 4) positions thereby actuating the clutch pack 124 to connect and disconnect drive and driven members 112, 114, respectively, as mentioned above.

More specifically, the piston 144 includes a head 150 that is adapted for compressive engagement with the first plate 127 of the clutch pack 124 thereby bringing the annular plates 126 and friction discs 130 into frictional contact to connect the drive and driven members 112, 114. In addition, the piston 144 includes a pressure plate 152 that is acted upon by the pressurized fluid in the expandable chamber 146 and a body 154 that extends between the head 150 and the pressure plate 152. A spacer 156 may be mounted on the pressure plate 152 to provide an initial small space between the piston 144 and the piston housing 142 when the piston is disposed in its disengaged position as best shown in FIG. 3.

The piston assembly 140 may also include a return biasing mechanism, generally indicated at 158, that is employed to move the piston 144 to its disengaged position. More specifically, the piston assembly 140 includes a return biasing member 160 that acts on the pressure plate 152 to bias the piston 144 to its disengaged position in a direction opposite to movement of the piston 144 in response to forces generated by the pressurized apply fluid acting in the expandable chamber 146 on the pressure plate 152 of the piston 144. A retainer 162 cooperates with the pressure plate 152 to define a balance chamber 164. The return biasing member 160 acts between the retainer 162 and the pressure plate 152. In addition, a source of pressurized balance fluid communicates with the balance chamber 14 via the balance port 166 extending through the piston hub 122. The balance fluid acts in the balance chamber 164 on the pressure plate 152 and in conjunction with the biasing member 160 to selectively move the piston 144 to its disengaged position (FIG. 3). Thus, the return biasing member 160 and the balance fluid acts on the pressure plate 152 to provide a force in a direction opposite to the force generated by the pressure of the fluid acting in the expandable chamber 146. As illustrated in FIGS. 3 and 4, the return biasing member 160 is a coiled spring captured between the retainer 162 and the pressure plate 152 of the piston 144. It will be appreciated by those having ordinary skill in the art that the return biasing member 160 may include any biasing mechanism conventionally known in the art and is not limited to a coiled spring.

As alluded to above, just before the clutch pack 124 is engaged, the plates 126 and disks 130 come into frictional contact with one another until the relative rotational speed between the plates 126 and disks 130 become zero. In this disposition, the plates 126 and disks 130 are either rotating together at one speed or are both held against rotation, depending on the particular application in a transmission, differential or brake system. In any case, during the engagement of the plates 126 and disks 130, kinetic energy is converted to thermal energy and a considerable amount of heat is generated. This heat must be dissipated.

To this end, a source of pressurized cooling fluid is also provided to the clutch pack 124 through the clutch housing 116. The main body 118 of the drive member 112 includes a cooling passage 168 defined therein. The cooling passage 168 is in fluid communication with an inlet port 170 extending through the piston hub 122. In turn, the inlet port 170 is in fluid communication with the source of pressurized cooling fluid. A plurality of outlet ports 172 extend through the main body 118 and are disposed spaced from one another annularly about the rotational axis of the clutch pack 124. The outlet ports 172 provide fluid communication between the cooling passage 168 and the clutch pack 124.

A control valve, generally indicated at 174, is supported in the clutch housing 116 and is moveable between open and closed positions. The control valve 174 is operable to control the flow of cooling fluid from the source to the clutch pack 124 as will be described in greater detail below. The control valve 174 includes an annular sealing plate 176 and a biasing member 178. The sealing plate 176 is supported in the cooling passage 168 adjacent the outlet ports 172 and is biased into the closed position by the biasing member 178. The friction device 110 also includes an actuator, generally indicated at 180. The actuator 180 illustrated in the embodiment of FIGS. 3 and 4 differs from the actuator 80 illustrated in FIGS. 1 and 2 in that the actuator 180 is operatively connected to the clutch pack 124 rather than the piston 144 as will be described in greater detail below. However, the actuator 180 illustrated in the friction device 110 shown in FIGS. 3 and 4 operates in essentially the same manner as that illustrated in FIGS. 1 and 2. More specifically, the actuator 180 is adapted to engage the control valve 174 such that movement of the piston 144 from the disengaged position to the engaged position moves the sealing plate 176 of the control valve 174 from the closed position (FIG. 3) to the open position (FIG. 4) to selectively allow flow of pressurized cooling fluid past the sealing plate 176, through the outlet ports 172, and into contact with the clutch pack 124 when the drive and driven members are connected. In addition, the actuator 180 is also operable to disengage the control valve 174 such that the sealing plate 176 moves to its closed position and covers the outlet ports 172 when the piston 144 moves from its engaged position to its disengaged position. In this way, the flow of pressurized cooling fluid into contact with the clutch pack 124 is selectively terminated when the drive and driven members are disconnected.

The actuator 180 includes stepped annular hub 182 extending from the clutch pack 124 toward the control valve 176. In the embodiment illustrated in FIGS. 3 and 4, the actuator 180 is operatively connected to the clutch pack 124. To this end, the annular hub 182 includes a radially extending annular flange 186 that is adapted for force transmitting contact with at least one of the plates of the clutch pack that is splined to the drive hub 120. More specifically, and as illustrated in FIGS. 3 and 4, the radially extending annular flange 186 may extend through the inlet flow passage 136 in the drive hub 120 and is adapted for force transmitting contact with the first plate 127 of the clutch pack 124. However, those having ordinary skill in the art will appreciate that the radially extending annular flange 186 may be in force transmitting contact with any one of the plates 126 or friction discs 130 that form the clutch pack 124. In this way, movement of at least one plate in response to movement of the piston 144 to its engaged position acts on the annular hub 182 of the actuator 180.

The annular hub 182 includes a plurality of fingers 184 that are defined at the distal end thereof. The plurality of fingers 184 are adapted to extend through the outlet ports 172 and move the sealing plate 176 from its closed position to its open position against the biasing force of the biasing member 178 when the piston 144 is moved to its engaged position (FIG. 4). In the preferred embodiment, the biasing member 178 includes a plurality of springs that are supported in the cooling passage 168 about the axis of rotation of the clutch pack 124. Collectively, these springs act to bias the sealing plate 176 to its closed position and in a direction opposite to the force generated by the actuator 180.

The friction device 110 illustrated in FIGS. 3 and 4 operates in the same manner as described with respect to the friction device illustrated in FIGS. 1 and 2. The only difference is that the actuator 180 illustrated in FIGS. 3 and 4 is moved in response to movement of at least one of the plates of the clutch pack 124 as opposed to the piston. Thus, the friction device 10, 110 illustrated in either embodiment provides coolant to the clutch pack 24, 124 when the coolant is needed, such as when the clutch or brake is engaged, and interrupts coolant to the clutch pack 24, 124 when the coolant is not needed, such as when the clutch pack is disengaged. In this way, the friction device 10, 110 of the present invention provides selective cooling on demand. Shear losses that are attributable to the coolant are reduced during open pack operation. The friction device 10, 110 of the present invention thereby facilitates the use of a smaller capacity pump when compared with conventional systems and this further reduces the cost of the associated transmission, differential, or brake system. Finally, the friction device 10, 110 of the present invention is operationally efficient and cost effective to manufacture relative to the complex systems known in the related art.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A friction device (10) comprising:
   a drive member (12) and a driven member (14) that are rotatable about a common axis (A) and that define a clutch housing (16) therebetween;
   a clutch pack (24) interposed between said drive and driven members (12, 14) and operable to connect and disconnect said drive and driven members for transferring and interrupting torque therebetween;
   a piston assembly (40) supported by said clutch housing (16) and moveable between a disengaged position wherein said drive and driven members (12, 14) are disconnected and an engaged position that connects said drive and driven members (12, 14) through said clutch pack (24);
   a source of pressurized cooling fluid that is provided to said clutch pack (24) through said clutch housing (16), a control valve (74) supported in said clutch housing

(16) and moveable between open and closed positions, said control valve (74) including an annular sealing plate (76) and a biasing member (78) that acts to bias said sealing plate (76) to said closed position, said control valve (74) operable to control the flow of cooling fluid from said source to said clutch pack (24); and an actuator (80) operatively connected to said piston assembly (40), said actuator (80) including an annular hub (82) extending from said piston assembly (40) toward said control valve (74), said hub (82) including a plurality of fingers (84) defined at the distal end of said hub (82), said plurality of fingers (84) adapted to engage said sealing plate (76) of said control valve (74) such that movement of said piston assembly (40) from said disengaged position to said engaged position moves said sealing plate (76) of said control valve (74) from said closed position to said open position against the biasing force of said biasing member (78) to selectively allow flow of pressurized cooling fluid past said control valve (74) and into contact with said clutch pack (24) when said drive and driven members (12, 14) are connected and further operable to disengage said control valve (74) such that said control valve (74) moves to its closed position when said piston assembly (40) moves from said engaged position to said disengaged position to selectively terminate flow of pressurized cooling fluid into contact with said clutch pack (24) when said drive and driven members (12, 14) are disconnected.

2. A friction device (10) as set forth in claim 1 wherein said drive member (12) includes a main body (18) and a hub (20), said main body (18) including a cooling passage (68) defined therein and a plurality of outlet ports (72) disposed spaced from one another annularly about the rotational axis (A) of said friction device (10), said outlet ports (72) providing fluid communication between said cooling passage (68) and said clutch pack (24), said sealing plate (76) supported in said cooling passage (68) and biased into said closed position by said biasing member (78).

3. A friction device (10) as set forth in claim 2 wherein said biasing member (78) includes a plurality of springs supported in said cooling passage (68) about said axis of rotation (A) and acting to bias said sealing plate (76) to said closed position and in a direction opposite to the force generated by said actuator (80).

4. A friction device (10) as set forth in claim 1 wherein said piston assembly (40) includes a piston housing (42) and a piston (44) moveably supported relative to said piston housing (42) and cooperating with said piston housing (42) to define an expandable chamber (46) between said piston (44) and said piston housing (42);

a source of pressurized fluid in communication with said expandable chamber (46), said piston (44) being responsive to the pressure of fluid in said expandable chamber (46) to move between said disengaged and said engaged positions thereby actuating said clutch pack (24) to connect and disconnect said drive and driven members (12, 14).

5. A friction device (10) as set forth in claim 4 wherein said piston (44) includes a head (50) that is adapted for compressive engagement with said clutch pack (24) to connect said drive and driven members (12, 14), a pressure plate (52) that is acted on by the pressurized fluid and a body (54) extending between said head (50) and said pressure plate (52).

6. A friction device (10) as set forth in claim 5 wherein said actuator (80) is operatively connected to said body (54) of said piston (44) and extends in a direction toward said control valve (74).

7. A friction device (10) as set forth in claim 5 wherein said piston assembly (40) further includes a return biasing member (58) acting on said pressure plate (52) to bias said piston (44) to said disengaged position in a direction opposite to movement of the piston (44) in response to forces generated by the pressurized apply fluid.

8. A friction device (10) as set forth in claim 7 wherein said piston assembly (40) further includes a retainer (62) that cooperates with said pressure plate (52) to define a balance chamber (64), said return biasing member (58) acting between said retainer (62) and said pressure plate (52), a source of pressurized balance fluid in fluid communication with said balance chamber (64) to act on said pressure plate (52) in conjunction with said biasing member (58) to selectively move said piston (44) to said disengaged position.

9. A friction device (10) as set forth in claim 1 wherein said drive member (12) includes a drive hub (20), said driven member (14) includes a driven hub (34), said clutch pack (24) including a plurality of annular plates (26) splined to said drive hub (20) and a plurality of annular friction disks (30) splined to said driven hub (34) and interleaved between said annular plates (26), said annular plates (26) and disks (30) rotating relative to one another in substantial non-contacting relationship when said clutch pack (24) is disconnected thereby interrupting torque translation between said drive and driven members (12, 14) and rotating substantially together when said clutch pack (24) is connected thereby translating torque between said drive and driven members (12, 14).

10. A friction device (10) as set forth in claim 9 wherein said drive hub (20) includes a plurality of inlet flow passages (36) for providing fluid communication of cooling oil to said clutch pack (24), said driven hub (34) including a plurality of outlet ports (34) extending through the driven hub (34) and about the rotational axis (A) of the friction device (10), said outlet ports (38) providing fluid communication for cooling fluid from said clutch pack (24) to a sump.

11. A friction device (110) comprising:

a drive member (112) and a driven member (114) that are rotatable about a common axis (A) and that define a clutch housing (116) therebetween;

a clutch pack (124) interposed between said drive and driven members (112, 114) and operable to connect and disconnect said drive and driven members (112, 114) for transferring and interrupting torque therebetween;

a piston assembly (140) supported by said clutch housing (116) and moveable between a disengaged position wherein said drive and driven members (112, 114) are disconnected and an engaged position that connects said drive and driven members (112, 114) through said clutch pack (124);

a source of pressurized cooling fluid that is provided to said clutch pack (124) through said clutch housing (116), a control valve (174) supported in said clutch housing (116) and moveable between open and closed positions, said control valve (174) operable to control the flow of cooling fluid from said source to said clutch pack (124); and an actuator (180) operatively connected to said clutch pack (124) and adapted to engage said control valve (174) such that movement of said clutch pack (124) from said disconnected position to said connected position moves said control valve (174) from said closed position to said open position to selectively allow flow of pressurized cooling fluid past said control valve (174) and into contact with said clutch pack (124) when said drive and driven members (112, 114) are connected and further operable to disengage said control valve (174) such that said control valve (174) moves to its closed position when said clutch pack (124) moves from said connected position to said disconnected position to selectively terminate flow of pressurized cooling fluid into contact with said clutch pack (124) when said drive and driven members (112, 114) are disconnected.

12. A friction device (110) as set forth in claim 11 wherein said control valve (174) includes an annular sealing plate (176) and a biasing member (178) that acts to bias said sealing plate (176) to said closed position, said actuator (180) including an annular hub (182) extending from said clutch pack (124) toward said control valve (174), said hub (182) including a plurality of fingers (184) defined at the distal end of said hub (182), said plurality of fingers (184) adapted to move said sealing plate (176) from said closed position to said open position against the biasing force of said biasing member (178) when said clutch pack (124) is moved to said connected position.

13. A friction device (110) as set forth in claim 12 wherein said drive member (112) includes a drive hub (120), said driven member (114) includes a driven hub (134), said clutch pack (124) including a plurality of annular plates (126) splined to said drive hub (120) and a plurality of annular friction disks (130) splined to said driven hub (134) and interleaved between said annular plates (126), said annular plates (126) and disks (130) rotating relative to one another in substantial non-contacting relationship when said clutch pack (124) is disconnected thereby interrupting torque translation between said drive and driven members (112, 114) and rotating substantially together when said clutch pack (124) is connected thereby translating torque between said drive and driven members (112, 114).

14. A friction device (110) as set forth in claim 13 wherein said annular hub (182) of said actuator (180) includes a radially extending annular flange (186) adapted far force transmitting contact with at least one of said plates (126) of said clutch pack (124) splined to said drive hub (120) such that movement of said at least one plate (126) in response to movement of said piston assembly (140) to said engaged position acts on said annular hub (186) of said actuator (180) to open said control valve (174).

15. A friction device (110) as set forth in claim 13 wherein said drive member (112) includes a main body (118) and a hub (120), said main body (118) including a cooling passage (168) defined therein and a plurality of outlet ports (122) disposed spaced from one another annularly about the rotational axis (A) of said friction device (110), said outlet ports (122) providing fluid communication between said cooling passage (168) and said clutch pack (124), said sealing plate (176) supported in said cooling passage (168) and biased into said closed position by said biasing member (178).

16. A friction device (110) as set forth in claim 15 wherein said biasing member (178) includes a plurality of springs supported in said cooling passage (168) about said axis of rotation (A) and acting to bias said sealing plate (176) to said closed position and in a direction opposite to the force generated by said actuator (180).

17. A friction device (110) as set forth in claim 13 wherein said drive hub (120) includes a plurality of inlet flow passages (136) for providing fluid communication of cooling oil to said clutch pack (124), said driven hub (134) including a plurality of outlet ports (138) extending through the driven hub (134) and about the rotational axis (A) of the friction device (110), said outlet port (138) providing fluid communication for cooling fluid from said clutch pack (124) to a sump.

* * * * *